United States Patent Office 3,300,641
Patented Jan. 24, 1967

3,300,641
GEOCHEMICAL EXPLORATION METHOD FOR DE-
TERMINING THE PROXIMITY OF AN UNDER-
GROUND PETROLEUM RESERVOIR
Bennie Heinze, Freehold, N.J., assignor to Cities Service
Oil Company, a corporation of Delaware
No Drawing. Filed Dec. 23, 1963, Ser. No. 332,919
8 Claims. (Cl. 250—71)

This invention relates to geochemical exploration. More particularly, it relates to the analysis of earth samples to determine the proximity of petroleum deposits.

The presence of petroleum constituents in earth samples can be accurately determined by measuring the fluorescence of the constituents of earth samples that are not mobile in polar chromatographic carrier solvents but are mobile in non-polar chromatographic solvents. This method, disclosed by Biederman and Heinze in copending application S.N. 94,168, now U.S. Patent 3,149,068, accurately distinguishes the fluorescence due to the desired petroleum constituents from the fluorescence due to other organic constituents that do not necessarily indicate the presence of petroleum.

The method of Biederman and Heinze is readily adapted for use in the field since it is relatively fast, employs a minimum of simple, rugged, equipment and is operable with very small earth samples.

It has now been found that further advantages of speed and accuracy can be obtained by separating, by means of solvent extraction, those constituents of earth samples taken from an exploration zone that are soluble in non-polar solvents from those that are soluble in polar solvents.

The proximity of an underground petroleum reservoir in an exploration zone is determined as a function of the ratio of the fluorescence of the constituents of the earth samples soluble in the non-polar solvent to that of the constitutents soluble in the polar solvent. By correlating the ratios for the various earth samples with the locations of the samples in the exploration zone, anomalous variations in the amount of petroleum constituents in the earth samples may be determined, the anomalies being indicative of the proximity of an underground petroleum reservoir. Of course, the total fluorescence of an earth sample, when considered in conjunction with this ratio, is also useful in determining the oil-bearing characteristics of an exploration zone. Oil present in the exploration, or prospecting, area may be recovered by drilling at least one well in the region having a relatively high ratio of non-polar to polar fluorescence constituents.

Any suitable solvent extraction technique may be used to separate the polar and non-polar constituents of the earth samples. Preferably, immiscible polar and non-polar solvents simultaneously contact the organic extract of an earth sample in a two-phase process. After sufficient agitation to assure equilibrium, the two-phases are permitted to separate. The non-polar fraction contains the more hydrocarbon-like, or reservoir-like, organic constituents of the earth extract, such as crude or tar. The non-hydrocarbon constituents, which are usually found in shales or water zones, tend to concentrate in the polar fraction. The total fluorescence of each phase is then measured with a fluorescence meter.

The polar solvents employed in accordance with this invention are those which have a preferred dissolving power for non-hydrocarbon compounds containing such elements as oxygen, nitrogen and sulphur. These compounds, which usually predominate in non-reservoir materials, such as shales, may be present at times in petroleum rock material, but their presence does not necessarily indicate the presence of petroleum. Suitable polar solvents include monohydric alcohols; glycols, such as ethylene glycol and propylene glycol; and ketones, such as acetone; water; and various combinations of these polar solvents. Samples of monohydric alcohols that have been used include: methanol, ethanol, isopropanol, and butanol.

The non-polar solvents, on the other hand, are those having a high solvency for the hydrocarbons predominant in reservoir rocks. Suitable non-polar solvents include straight chain paraffins, branched chain paraffins, cyclo-paraffins, aromatics, and combinations of these types. Straight chain paraffins having from 5 to about 10 carbon atoms may be used, with heptane and hexane generally preferred. Branched chain paraffins and cycloparaffins having from 5 to about 10 carbon atoms may also be employed. Aromatic non-polar solvents that may be employed include benzene, toluene and xylene. The aromatic solvents are generally used in combination with other types of non-polar solvents in order to assure the extraction of all of the organic constituents from the earth extract. Generally from about 1 to about 20% by volume of aromatic non-polar solvent in an aliphatic non-polar solvent is useful.

Among the polar solvents, ethylene glycol has been found especially suitable; whereas, among the non-polar solvents, heptane has been found especially suitable. These solvents are particularly suitable for the preferred two-phase extraction technique since they are immiscible and differ sufficiently in density so as to separate rapidly upon standing. The addition methanol or isopropanol to the ethylene glycol in amounts up to 20% by volume, together with varying amounts of water, has often been found desirable. While the exact proportions are not critical, a preferred polar solvent is about 85% by volume ethylene glycol mixed with about 15% by volume methanol. A preferred non-polar solvent is about 85% by volume heptane mixed with about 15% by volume toluene. The optimum solvent composition for any given analysis will depend upon the properties of the crude in question.

Any suitable earth sample can be analyzed in accordance with the present invention, with well cuttings and cores being preferred samples.

The earth sample to be analyzed may be crushed and added directly to the vial containing the polar and non-polar solvents, especially if a mechanical agitator is employed to speed equilibrium. However, the crushed earth sample tends to accumulate at the solvent interface and on the walls of the vial, thereby interferring with the concentration readings in the solvents. For this reason, it is desirable to first treat the earth sample with a suitable single phase, primary organic solvent capable of extracting from the samples all of the fluorescent organic constituents included therein, including the desired fluorescent petroleum constituents. This extract is then contacted with the polar and non-polar solvents in the two-phase extraction process. Suitable primary solvents for this purpose include, for example, benzene, toluene, xylene, carbon tetrachloride, diethylether, ethyl acetate, etc. Combinations of strong non-polar solvents, such as benzene or toluene, with one or more polar solvents such as isopropanol, ethanol, methanol, or acetone are particularly suitable. A preferred primary solvent for making the initial separation of organic constituents from earth samples is isopropanol and toluene, for example in a 1:1 mixture.

The presence of an underground petroleum reservoir is determined, according to the present invention, by anomalous variations in the ratio of the fluorescence of non-polar soluble constituents to that of polar soluble constituents. So long as a group of earth samples taken from a given exploration, or prospecting, area are treated in the same manner, it is not necessary that the polar and non-polar solvents be both either weak or strong solvents.

It has been found, however, that the distinction between reservoir or crude-like hydrocarbons and organic constituents extracted from non-reservoir shales, in accordance with the present invention, is maximized by using a weak non-polar solvent such as heptane or hexane and a polar solvent such as ethylene glycol.

The present invention has been used to investigate the San Andres formation as it occurs in the Northern Permian basin, in the State of Texas. Earth samples were extracted with toluene as the primary solvent. Approximately 0.0001 ml. of rock extract were added to a vial containing 1.75 ml. ethylene glycol, 1.75 ml. heptane, 0.25 ml. isopropanol and 0.25 ml. toluene. The more polar compounds were retained in the glycol phase that sank to the bottom of the vial, and the reservoir hydrocarbons were retained in the heptane phase which floated on top. The total fluorescence of each phase was then measured under high intensity ultraviolet light (3660 A.). It was observed that the ratio of the fluorescence of the heptane fraction to the fluorescence of the glycol fraction increased as the known or measurable amount of oil contained in the rock samples increased. It was observed that only about four to five percent of the total fluorescence was retained in the ethylene glycol fraction when reservoir rock was analyzed. As the ratio of the fluorescence of the non-polar to the polar fraction increases, the area is considered more favorable for prospecting. The rapidity with which a large number of earth samples may be accurately analyzed at the exploration site, in accordance with the method described and claimed herein, represents a significant advance in the ability of the art to quickly and efficiently evaluate a given exploration area.

It will be understood that various changes in the detail that have been herein described in order to explain the nature of the invention may be made by those skilled in the art within the principle and scope of the invention as expressed in the appended claims.

I claim:
1. A geochemical exploration method of determining the proximity of an underground petroleum reservoir in which the proximity of such a reservoir to earth samples taken from predetermined locations in an exploration zone is determined as a function of the fluorescent constituents of the earth samples extractable in polar and non-polar solvents comprising:
   (a) collecting earth samples from said exploration zone;
   (b) contacting the earth sample with an organic solvent to extract organic constituentts therefrom;
   (c) separating by means of solvent extraction those constituents of said earth extracts which are soluble in a non-polar solvent from those constituents which are soluble in a polar solvent;
   (d) measuring the fluorescence of each extract under ultraviolet radiation; hydrocarbons predominating in those reservoir rocks in which a relatively high ratio of non-polar to polar fluorescent constituents exists whereas nonhydrocarbons predominate in those reservoir rocks in which a relatively low ratio of non-polar to polar fluorescent constituents exist;
   (e) correlating the ratios of the fluorescence of the constituents soluble in the non-polar solvent to that of the constituents soluble in the polar solvent for the various earth samples with the sample locations in the exploration zone.

2. The method of claim 1 in which the polar solvent is selected from the group consisting of ethylene glycol, ethylene glycol and alcohols having from 1 to about 3 carbon atoms, and mixtures of the above with water.

3. The method of claim 1 in which the non-polar solvent is selected from the group consisting of hexane, heptane, and mixtures of the above with toluene.

4. The method of claim 1 in which the earth samples are contacted simultaneously with the polar and non-polar solvents, said solvents being immiscible and differing in density sufficiently to permit a rapid separation upon standing, and including the step of separating the polar and non-polar phases after extraction by means of the difference in density of the immiscible phases.

5. The method of claim 4 in which the polar solvent is selected from the group consisting of ethylene glycol, ethylene glycol and alcohols having from 1 to about 3 carbon atoms, and mixtures of the above with water; and the non-polar solvent is selected from the group consisting of hexane, heptane and mixtures of the above with toluene.

6. A method for recovering oil from subsurface geological formations in a prospecting area comprising:
   (a) collecting earth samples from said prospecting area;
   (b) contacting the earth sample with an organic solvent to extract organic constituents therefrom;
   (c) separating by means of solvent extraction those constituents of said earth extracts which are soluble in a polar solvent from those constituents which are soluble in a non-polar solvent;
   (d) measuring the fluorescence of each extract under ultraviolet radiation, where by the ratio of the fluorescence of the constituents soluble in the non-polar solvent to that of the constituents soluble in the polar solvent may be determined.
   (e) correlating these ratios for the various earth samples with the sample locations in said prospecting areas; and
   (f) drilling at least one well in the region having a relatively high ratio of non-polar to polar fluorescent constituents, said high ratio indicating a greater presence of hydrocarbons predominant in reservoir rocks whereas a relatively low ratio of non-polar to polar fluorescent constituents indicates a great presence of oxygen, nitrogen and sulfur compounds characteristic of non-reservoir rock.

7. The method of claim 6 in which the earth samples are contacted simultaneously with polar and non-polar solvents, said solvents being immiscible and differing in density sufficiently to permit a rapid separation upon standing, and including the step of separating the polar and non-polar phases after extraction by means of the difference in density of the immiscible phases.

8. The method of claim 7 in which the polar solvent is selected from the group consisting of ethylene glycol, ethylene glycol and alcohols having from 1 to about 3 carbon atoms, and mixtures of the above with water; and the non-polar solvent is selected from the group consisting of hexane, heptane, and mixtures of the above with toluene.

References Cited by the Examiner

UNITED STATES PATENTS

| 2,459,512 | 1/1949 | Fash | 250—71 |
| 3,149,068 | 9/1964 | Biederman | 23—230 X |

RALPH G. NILSON, *Primary Examiner.*

JAMES W. LAWRENCE, *Examiner.*

S. ELBAUM, *Assistant Examiner.*